US010021821B2

United States Patent
Hennes

(10) Patent No.: US 10,021,821 B2
(45) Date of Patent: Jul. 17, 2018

(54) AGRICULTURAL IMPLEMENT WITH TREADER-REEL FINISHING ATTACHMENT

(71) Applicant: Mark Hennes, Beloit, KS (US)

(72) Inventor: Mark Hennes, Beloit, KS (US)

( * ) Notice: Subject to any disclaimer, the term of this patent is extended or adjusted under 35 U.S.C. 154(b) by 309 days.

(21) Appl. No.: 15/072,650

(22) Filed: Mar. 17, 2016

(65) Prior Publication Data

US 2016/0270285 A1  Sep. 22, 2016

Related U.S. Application Data

(60) Provisional application No. 62/134,535, filed on Mar. 17, 2015.

(51) Int. Cl.
| | | |
|---|---|---|
| *A01B 61/04* | (2006.01) | |
| *A01B 29/04* | (2006.01) | |
| *A01B 49/02* | (2006.01) | |

(52) U.S. Cl.
CPC .......... *A01B 49/027* (2013.01); *A01B 61/046* (2013.01)

(58) Field of Classification Search
CPC .......... A01B 15/18; A01B 59/04; A01B 5/04; A01B 61/044; A01B 61/046; A01B 61/048; A01B 29/048; A01B 29/00; A01B 29/04; A01B 63/14; A01B 63/32; A01B 63/24; A01B 73/046; A01B 73/065; A01B 49/027; A01B 79/005; A01B 39/08; A01B 35/28
USPC .... 172/1, 4, 260.5, 578, 599, 669, 748, 170, 172/195, 200, 147, 504, 520, 151
See application file for complete search history.

(56) References Cited

U.S. PATENT DOCUMENTS

| | | | |
|---|---|---|---|
| 583,397 A | 5/1897 | Hagstrom et al. | |
| 2,229,290 A | 1/1941 | Gosser | |
| 2,256,185 A | 9/1941 | Kriens | |
| 3,106,967 A | 10/1963 | Van Der Lely et al. | |
| 9,775,278 B2 * | 10/2017 | Zemenchik | A01B 79/005 |
| 2014/0054051 A1 * | 2/2014 | Landoll | A01B 63/008 |
| | | | 172/170 |

(Continued)

OTHER PUBLICATIONS

Landoll, Model 7431 VT Plus Parts Manual, F-562-0610, Jun. 2010, p. 2-38, Landoll Corporation, Marysville, Kansas 66508.

(Continued)

*Primary Examiner* — Robert E Pezzuto
(74) *Attorney, Agent, or Firm* — Jeffrey L. Thompson; Thompson & Thompson, P.A.

(57) ABSTRACT

An agricultural tillage implement has a main frame with a plurality of ground support wheels, and a finishing attachment arranged behind a group of primary seedbed preparation tools. The finishing attachment includes a reel assembly having an over-frame tube to which reel standards are attached, and reel arms that connect the over-frame tube to the implement frame. The reel arms are attached to the over-frame tube by a flex pivoting connection that allows at least one degree of freedom movement when the reel encounters an obstruction. The reel assembly includes a rolling reel basket having slats made from half-round material. The slats are oriented with leading edges that provide clod breakage and residue pinning action during their descent, and rounded surfaces for firming soil at their lowest quadrant position. A push configuration treader assembly with multiple operation modes can be mounted compactly close to and ahead of the reel assembly.

13 Claims, 7 Drawing Sheets

(56) References Cited

U.S. PATENT DOCUMENTS

2014/0251646 A1\* 9/2014 Gray .................... A01B 61/044
                                                            172/1
2015/0053433 A1\* 2/2015 Kovach ................ A01B 49/027
                                                            172/1

OTHER PUBLICATIONS

Landoll, Model 7450 VT Plus Operator's Manual, F-607-0114, Jan. 2014, pp. 3-24 to 3-25, Landoll Corporation, Marysville, Kansas 66508.
Landoll, Model 7450 VT Plus Parts Manual, F-608-0114, Jan. 2014, pp. 2-41 to 2-43, Landoll Corporation, Marysville, Kansas 66508.
Landoll, 7400 Vertical Tillage, The Most Versatile VT on the Market, pp. 2 to 8, Landoll Corporation, Marysville, Kansas 66508.
Agco, Tillage Operator Manual, Sunflower 6631 Split-Wing Vertical Tillage, p. 127.
Great Plains Manufacturing, Inc., Parts Manual, Turbo Max 1800TM, 2400TM, & 3000TM, pp. 82 to 85, May 3, 2012.
Krause, 8000 Series Excelerator TM, Owner's Manual, pp. 26 to 27, 30, 84 to 95, 152 to 155, and 159 to 160, 2012 Kuhn Krause, Inc.
Kuhn Krause, Vertical Tillage Excelerator 8000, Kuhn Krause, Inc., pp. 1 to 8, Hutchinson, KS 67504.

\* cited by examiner

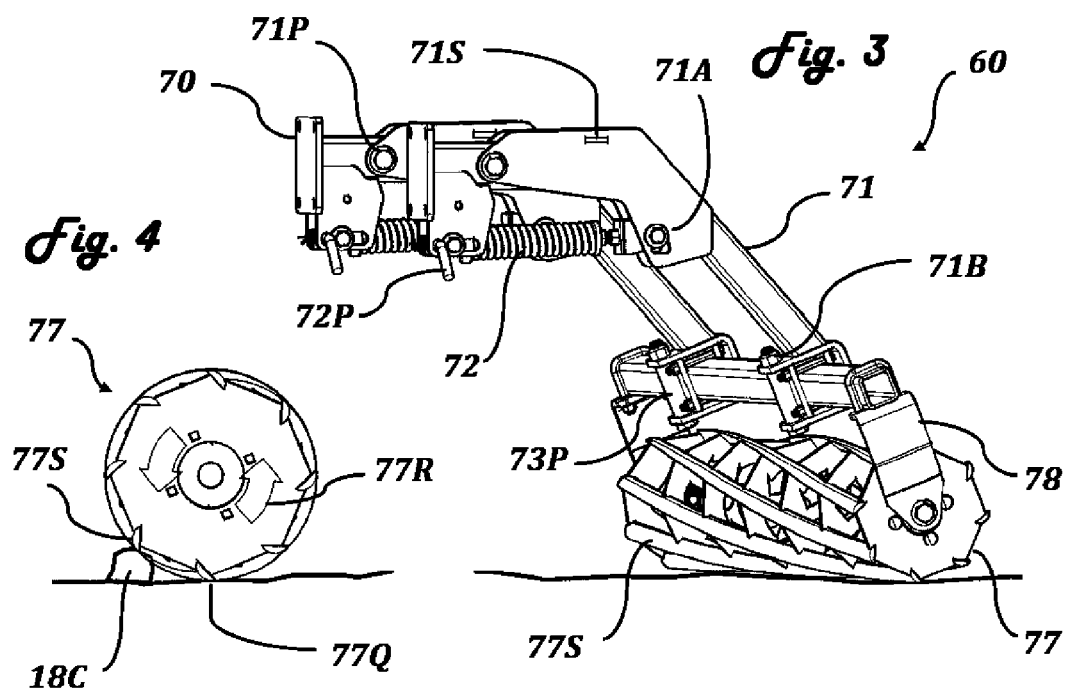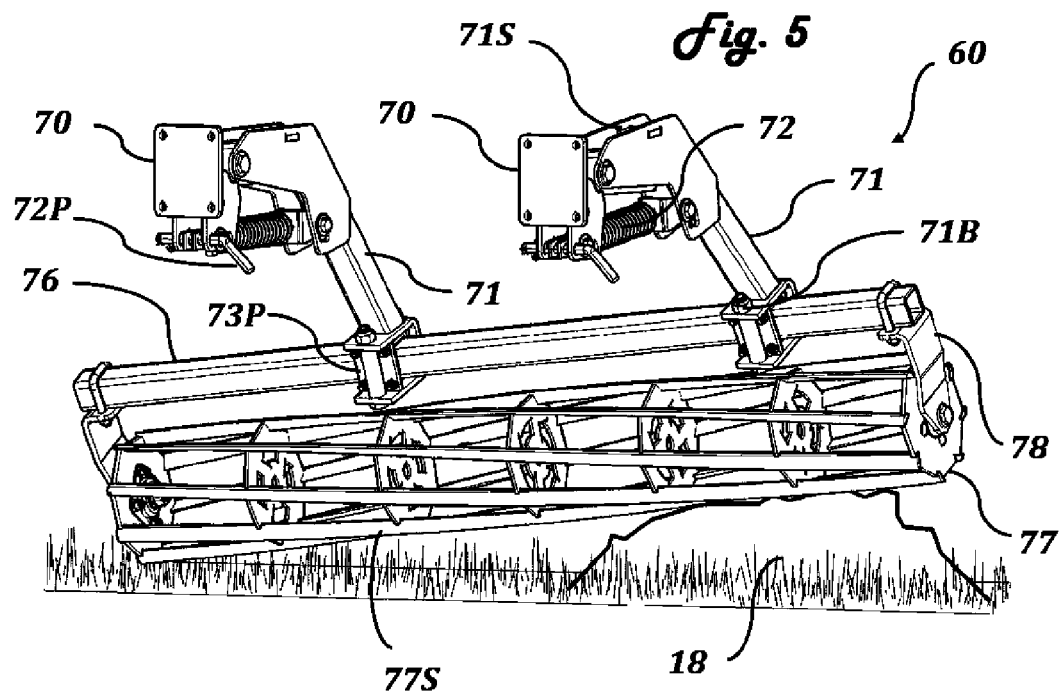

AGRICULTURAL IMPLEMENT WITH TREADER-REEL FINISHING ATTACHMENT

RELATED APPLICATIONS

This application claims priority of U.S. Provisional Application No. 62/134,535 filed on Mar. 17, 2015. The content of this prior application is incorporated herein by reference.

BACKGROUND OF THE INVENTION

Field of the Invention

The present invention relates generally to tillage equipment, primarily used for soil cultivation, residue management and seedbed preparation.

Description of Related Art

In the past 15 years a new class of tillage tools has evolved that has been classified and marketed as "vertical tillage tools." Although many different forms of "vertical tillage" tools are in use and are being developed, the most common and most widely used are the tillage tools with two primary gangs of rotatable soil engagement tools that follow each other along a same line of travel, with some form of trailing attachment to provide secondary tillage, field leveling, chemical incorporation, clod sizing and seedbed firming.

Most of these "vertical tillage" tools use gangs of straight coulters or shallow concavity disc blades spaced 7-10" apart running at gang angles generally below 5 degrees, to perform residue management and to create no-till and min-till seedbeds. The unworked soil left between the primary gang blades is usually tilled by a treader or rolling harrow attachment running behind the two primary gangs. This attachment works best if it selectively targets the unworked soil strips between the blades by its lateral spacing and positioning of the attachment relative to the primary gangs. This prevents overworking areas that the primary gangs have already tilled and generates a more uniform tillage pattern and more consistent working depth across the machine. Treader attachments that selectively target the un-tilled soil is found in the prior art. The prior art treader gangs are pull-type trailing, spring or hydraulic down pressure induced, with high pivot points and steep standard angles to minimize front to rear implement distance and reduce negative tongue weight. Trailing, spring-biased treader or rolling harrow gangs are susceptible to damage when operated in a reverse direction of travel. Because these tools run in wet and adverse conditions, gang lodging and mud buildup in gangs around mud scrapers is common. The easiest clean out process for a lodged gang is to reverse the machine travel direction and slowly lower the machine to the ground to reverse the gang rotation direction in order to dislodge the mud and residue buildup from the gangs. This may cause component damage or breakage to the trailing treader/rolling harrow gangs or components from gangs wanting to buckle under.

Most related art "vertical tillage" tools have a rolling finishing reel attachment mounted independently behind the treader/rolling harrow attachment to smooth and firm the seedbed surface. The finish reel normally has spring-biased down pressure with some manufacturers having a float setting for wet conditions. Some related art reel attachments have adjustable down pressure also. Most manufacturers offer finishing reel designs with flat-bar or round-rod slats. The flat-bar slats are marketed as having better clod breakage action and better residue pinning action over the round-bar slat. The round-bar slat is marketed as having better firming action over flat bar slats. Manufacturers offer both types, but owners have to choose one over the other at the time of purchase.

Some manufacturers are starting to offer a heavier "soil conditioning" reel attachment in the 14"+diameter range instead of the more common 11-13" diameter "finishing reel" attachment. These "conditioning reels" break dry clods better and make leveler, firmer seedbeds. The extra weight and down pressure of the heavier reels induce greater bolt connection loads when tripping over one-sided obstructions. Manufacturers have had to increase bolt strength and bolt numbers at the reel over-frame tube connection to prevent bolt failures. This solution does not address the overloading of the reel bearings due to the lack of reel gang flexibility.

There is a need in the industry for a better, more compact, more versatile treader-reel attachment configuration that does not incur damage from repeated reverse travel directions and provides additional benefits and tillage options not previously available.

SUMMARY OF THE INVENTION

A vertical tillage tool as described above is used to do light min-till tillage, no-till residue management and seedbed preparation. The tool is used in all seasons in a wide variety of field and residue conditions.

A common rear attachment found on seedbed preparation tillage tools is the finishing reel, whose purpose is to break up and resize clods, tuck and anchor residue, and firm and level the seedbed surface. Due to the wide variety of field conditions and soil types, it has become common in the industry to provide either a "flat bar" or a "round rod" slatted reel option, at the time of purchase, where you are allowed to only choose one type. The flat bar reel slat is typically made of ¼"×1¼" flat bar material, bent into a helical shape and welded into the reel support plates. This "flat bar" slat configuration provides good clod breakage with adequate residue pinning and some soil firming. Alternatively, a "round rod" slat, typically ¾" or ⅞" diameter, reel may be chosen which provides lesser clod breakage action, very minimal residue pinning but better ground firming action than flat bar slats due to the larger soil contact area. A feature of the present invention provides a new reel design that is made from "half-round" stock material that provides better clod breakage and residue tucking action than the flat bar slat and better soil firming action than the round bar slat reel all in one design. The "half-round" slats are positioned in the reel support plates in a manner to allow the sharp edge of the slat material to engage residue and clods on its leading edge decent motion, thus providing a cutting/pinning action to the clods and residue. As the slat rotation is progressed to the lowest possible position, the rounded part of the "half-round" material is then in full contact with the soil when the weight/down pressure of the reel assembly is at its greatest, thus providing an equivalent soil firming action as a round rod slat.

Finishing reel/soil conditioning attachments that provide higher levels of down pressure action have experienced increased bolt stresses and bolt failure rates in the bolted connection between the reel arm and the reel over frame tube. This is primarily due to the binding action placed on the connection bolts when the reel encounters a one-sided field obstruction or mounded soil structure that lifts one side up while the down pressure spring on the other side prevents its side from also moving up. The common solution has been to increase the size, number and strength of the connection bolts to prevent breakage. This may cause reel arm pivot pin binding and excessive bearing and component loads when a one-sided obstruction occurs. A flexible connection between the reel arm and the reel over frame tube is needed to allow the reel to freely flex over obstacles without creating excessive loading of components. A feature of the present invention provides a reel arm to over frame connection design that occupies a very narrow amount of over frame tube yet allows two degrees of flex freedom when encountering one-sided obstacles. The narrow design is beneficial when used in conjunction with another invention feature, where treader mounting brackets are attached to the same over frame tube. The third degree of freedom movement is held rigid, namely, twist along the axis of the over frame tube, to prevent the reel from pivoting forward or backward which is in the same direction as its normal field loading to provide stable operation.

In a no-till, "true vertical" minimal soil disturbance farming operation, the primary tillage tools are arranged to provide the absolute minimal amount of lateral soil disturbance in order to maintain the present soil integrity and soil structure. With gang angles set to very low values, full soil cutout is not possible and un-touched residue and soil is left in-between the tillage paths of the primary tillage tools. It is common in the industry, with this type of tillage operation, to use a rear attachment for the purpose of tilling the soil and residue left between the primary tillage blade paths. Selective targeting of the un-tilled soil bands by lateral spacing and placement of treader soil engagement teeth, provides a fairly consistent tillage operation across the full width of the tillage tool without over working the areas where the primary tools have already ran. A trailing, spring biased, rolling treader gang set at a slight angle perpendicular to the line of travel, has been used successfully in the industry to achieve this tillage objective. As mentioned before, some not-so-obvious problems are inherent in the prior art trailing treader configuration. The steep angle of the trailing treader standards, with their high pivot points make them very susceptible to damage if the implement is backed up with the tillage tools on the ground.

To avoid the backup damage problems associated with trailing-type treader gangs, and to provide greater treader/reel combination versatility, a push configuration treader is featured in the present invention that has benefits and features over a trailing configuration. No treader damage will occur when backing up with tillage tools lowered to the ground. The treader and reel arrangement is more compact front to back due to treader gang trip being near vertical. The treader generates its own dynamic, draft induced down pressure because of its push configuration. Active spring load requirement is lower than a trailing configuration due to self-induced down pressure, resulting in quick trip intervals and better rock protection. A treader float mode is feasible with a push configuration due to the draft-induced down pressure. This float mode can significantly reduce treader damage and tooth breakage in rocky conditions and can prevent treader mud buildup in wet conditions. A pin-up mode allows the treader to run completely off the ground when field conditions are very wet or to gain extra firming action to the reel, such as in seedbed preparation.

A unique skim mode allows residue tucking, clod sizing and field leveling with minimal bearing loading while adding some of its weight to the finishing reel. Finishing reel can then be operated in float mode with the extra weight of the treader in skim or pin up mode. Treader pivot points use ball joint connections to prevent pin binding during one-sided trip conditions. Quick disconnect arms allow treader gangs to be removed fast and easily to lighten the implement for spring time dry-out operations. Another benefit is that an "after-the-sale" treader purchase can be added to the implement with minimal changes to the existing reel setup. Conventional/min-till farmers will want the reel only setup but not likely need a treader attachment. If the machine is later sold to a no-till farmer, the treader gang can be easily added to the existing reel setup with minimal changes.

Numerous other objects of the present invention will be apparent to those skilled in this art from the following description wherein there is shown and described exemplary embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

FIG. 3 is a partial orthographic side view of the reel-only finishing attachment with half-round slat basket assembly, featuring a flexible bolt connection between the reel arm and reel over frame tube.

FIG. 4 is a partial section side view of the of the reel basket weldment assembly with half round slats 77S contacting the surface clod 18C and slat 77S contacting the ground at lowest quadrant position 77Q.

FIG. 5 is partial perspective front view of the reel-only finishing attachment encountering a one-sided field obstruction showing reel assembly flex connection trip arrangement.

DETAILED DESCRIPTION OF THE INVENTION

An agricultural implement according to the present invention will now be described in detail with reference to FIGS. 1 to 12 of the accompanying drawings.

Figure 1:
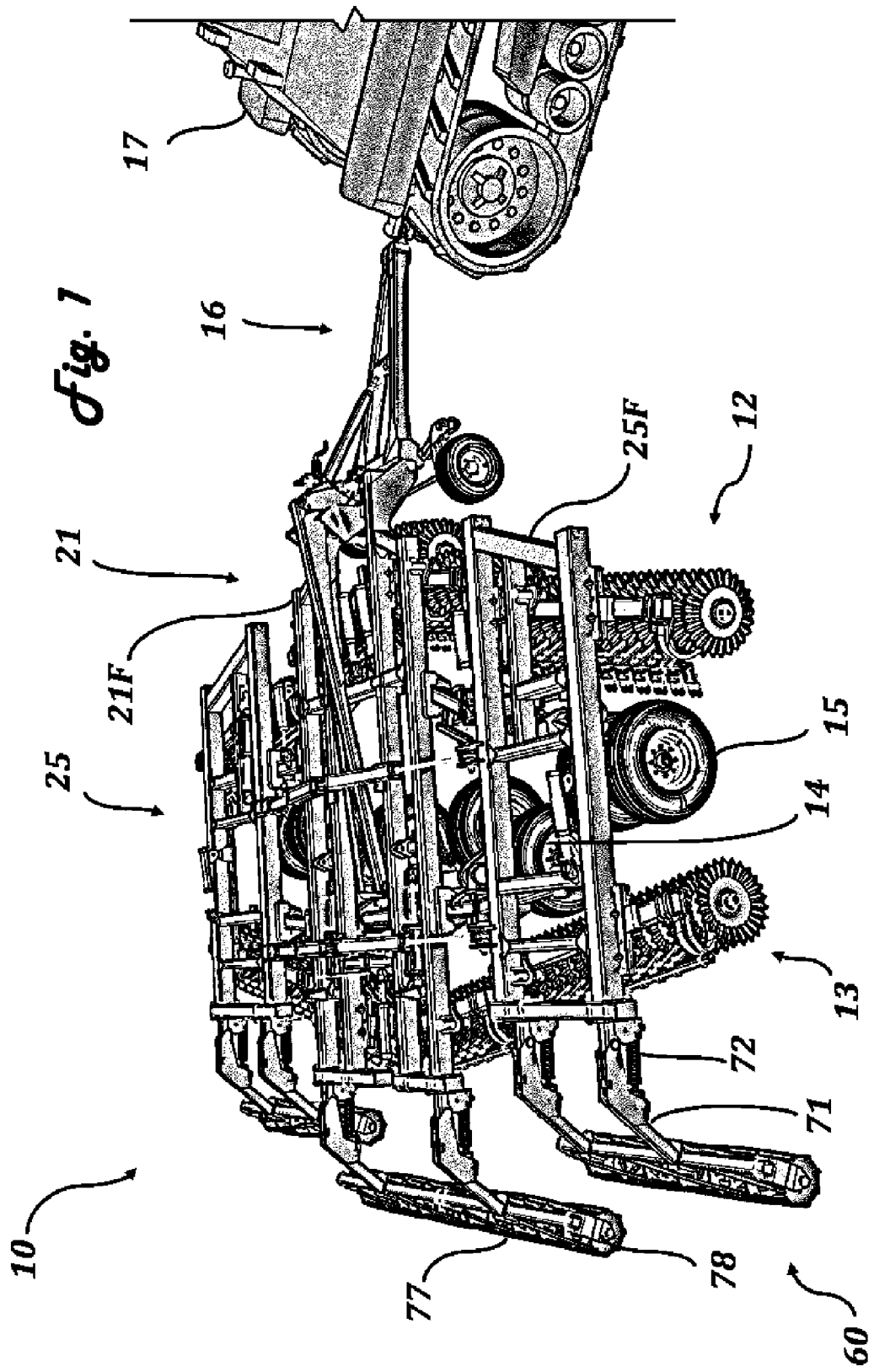
FIG. 1 is a perspective side view of a shallow working tillage tool with a reel-only finishing reel attachment operating in a min-till configuration.
Figure 2:
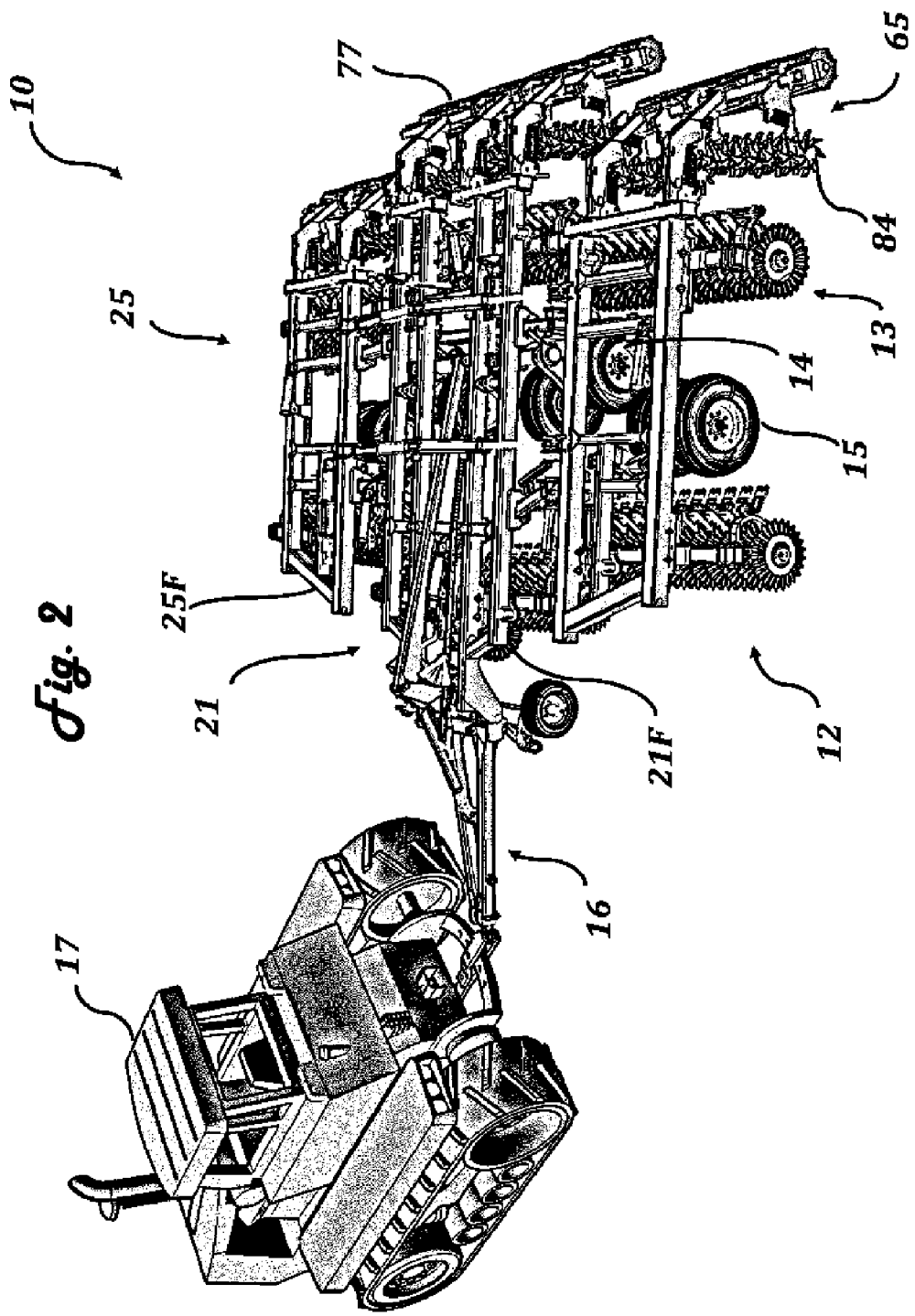
FIG. 2 is a perspective side view of a shallow working tillage tool with a treader and finishing reel attachment operating in a no-till configuration.

A shallow working tillage implement 10 according to the present invention is shown in FIGS. 1 and 2. The implement 10 is connected to a towing vehicle 17 by a hitch assembly 16. The implement 10 is a three section configuration with a center section 21 and lateral wings sections 25 on each side. Each section has a main frame 21F and 25F to which tillage tools 12 and 13 and wheel assemblies 14 and 15 are attached. At the trailing edge of the main frames 21F and 25F, a finishing attachment 60 and 65 is mounted to level, smooth, firm and condition the soil and residue for the next farming operation.

The implement in FIG. 1 is a "min-till" shallow working tillage tool having two gangs of rotatable tillage tools, 12 and 13, that follow each other along a line of travel where the lateral soil displaced by the front gangs is laterally returned by the rear gangs. The gang angles are set to approximately 12 degrees from a line perpendicular to the line of travel, and the gang blade spacing is approximately 7.5". In this "min-till" configuration, with a ground speed of 7-8 mph, the implement will provide a full soil cutout operation in favorable conditions. A reel-only attachment 60, is shown trailing behind the two primary tillage gangs 12 and 13. With adequate gang angle and soil cutout, the reel-only attachment 60 is a preferred attachment.

The implement in FIG. 2 can be classified more as a "no-till true-vertical" shallow working tillage tool having two gangs of rotatable tillage tools, 12 and 13, which follow each other along a line of travel. The gang angles are set to a very low angle, less than 4 degrees from a line perpendicular to the line of travel, and the gang blade spacing is approximately 7.5". In this "no-till nearly true-vertical" configuration, even with ground speeds greater than 8 mph, the implement will not provide full soil cutout operation. A reel and treader attachment 65, is shown trailing behind the two primary tillage gangs 12 and 13. The treader gang is needed to till and manage residue left un-touched between the two primary tillage gangs. To minimize front to back implement distance and to make the attachments work on multiple types of machines, a compact, versatile, universal mounted, reel and treader system is needed. The present invention provides these benefits along with extra flexibility and modes of operations not found on prior art finishing attachments.

FIG. 3 shows a partial view of the reel-only min-till attachment. The rear attachment mounting head 70 is secured to the trailing edge of the main frames 21F and 25F as shown in FIGS. 1 and 2. The reel arm 71 is pivotally attached to the mounting head 70 at the reel arm pivot 71P. A down pressure spring assembly 72 provides varying working down pressure to the rolling reel basket 77 through the setting of the adjustments positions 71A and the reel spring release pin 72P. A reel arm stop 71S is engaged when the machine is in its raised lift position.

FIG. 4 shows a partial section view of the rolling reel basket 77 encountering a field surface clod 18C during its leading edge decent and forward travel rotation 77R. The half-round slat 77S has a flat side, a rounded side, and an edge between the flat and rounded sides. The half-round slat 77S has the shape of a truncated cylinder cut along a plane parallel to a longitudinal axis of the cylinder. The slat 77S is oriented so that the edge between the flat and rounded sides is a leading edge relative to a direction of rotation during operation. The half-round slat 77S is angularly arranged, by angle $\beta$ in FIG. 11, within the basket assembly 77, to best penetrate clods and residue during the leading edge decent and forward rotation 77R. The half-round slat 77S is also shown at its lowest quadrant position 77Q. The slat 77S is oriented in this position to provide a soil firming action with its rounded curved surface against the soil surface as shown.

FIG. 5 shows a partial perspective view of the reel-only finishing attachment 60 shown on the implement 10 in FIG. 1. The finishing reel attachment 60 is shown encountering a one-sided field obstruction 18. A feature of the present invention is a narrow flexible connection between the reel arms 71 and the reel over-frame tube 76. A reel arm pivoting bolt arrangement 71B, with a 4-hole clamp plate 73P allows the flex connection one-degree of freedom movement when encountering an obstruction as shown. The clamp plate assembly 73 and 73P, shown in FIG. 8, maintains a rigid connection to the reel over frame tube 76 without slippage during flexing.

Figure 6:
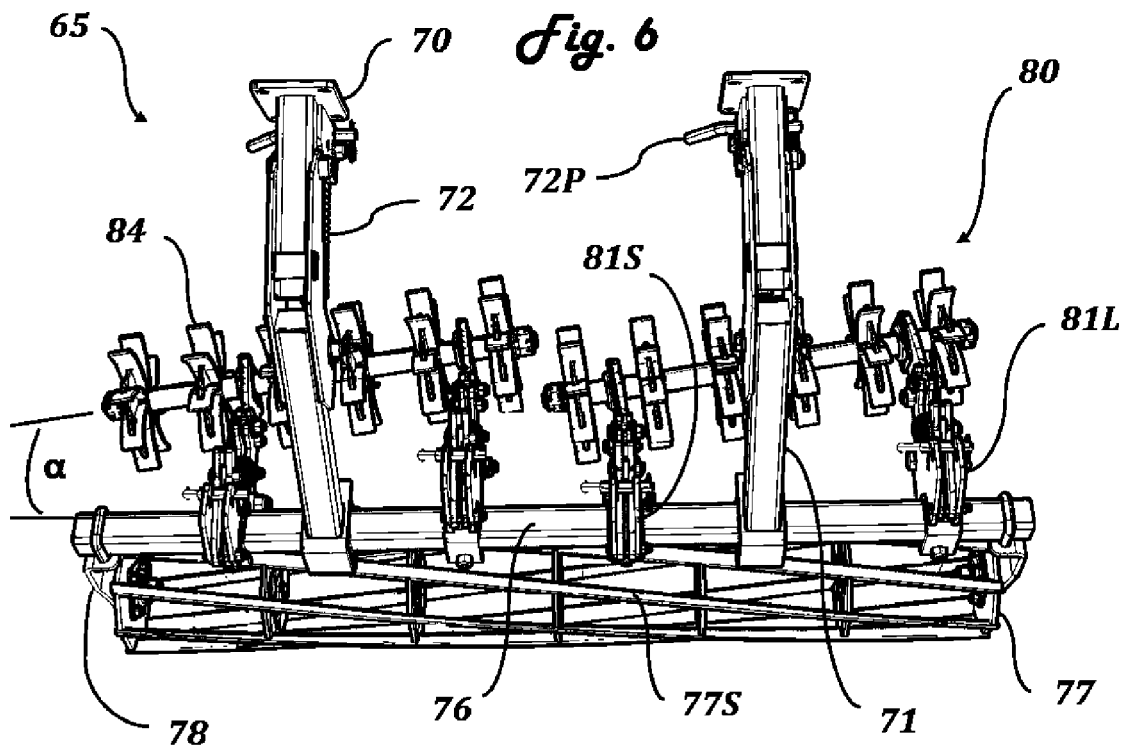
FIG. 6 is a partial perspective top rear view of the treader and finish reel attachment with narrow over frame tube flex connections and lateral adjustable treader mounting brackets 81S and 81L attached to reel over frame tube 76.
Figure 7:
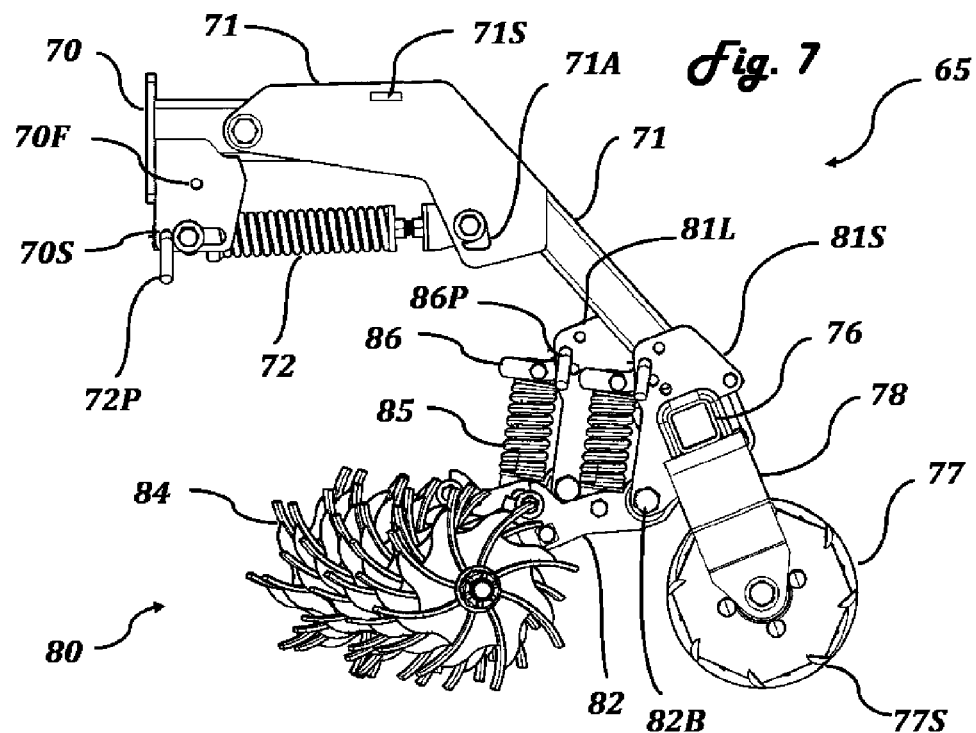
FIG. 7 is a partial side view of the treader and finish reel attachment showing treader gang positioning relative to finish reel, with treader gang in active spring mode.

Another feature of the present invention is a push-configuration treader and reel attachment 80 as shown in FIGS. 6 and 7. The narrow flex pivoting connection arrangement between the rolling reel attachment arms 71 and the reel over-frame tube 76 provides optimum lateral arrangements of the treader gangs and allow both the rolling reel baskets 77 and the push configuration treader gangs 84 to flex more easily over one-sided obstructions. This prevents rigid connection assembly bolt breakage and reel arm pivot pin 71P binding problems that are increased by the extra weight of the combination treader and reel assembly. The treader gangs attach to the reel over-frame tube 76 to provide a very compact treader and reel arrangement to reduce overall implement length and reduce unsafe tail heavy implement conditions. The treader mounting brackets 81S and 81L are made to adjust laterally to selectively target the soil and residue left between the two primary tillage gangs. The treader gangs are mounted at an angle $\alpha$, relative to the reel over-frame tube 76 by using variable length mounting brackets 81S and 81L and arms 82 that can be made in different lengths to accommodate various gang sizes and placements. This angle provides necessary staggering of gangs and to enhance tillage action. An angle of 5 to 10 degrees provides good tillage action and staggering.

FIG. 7 shows a side view of the push-configuration treader in an active spring mode setting. The treader mode spring lever 86 is held down by the placement of pin 86P in the active spring setting hole. The compression springs 85 are compressed as the treader gang 84 and treader arms 82 pivot upward at pivot points 82B. The treader trip action is near vertical due to the low positioning of the pivot point 82B, at or slightly below the reel over frame tube height, thus making the overall arrangement of the treader and reel assembly very compact front to back which is very beneficial to reducing tail heavy implement situations. The low positioning of the pivot points 82B also provide self-draft induced dynamic downforce loading of the treader while also providing quick vertical trip and efficient obstacle damage protection. The ball joint connection 82B also provides multiple degrees of flex freedom during one sided obstacle encounters while providing better soil to treader contact and function with enhanced rock trip protection. This helps prevent pivot pin binding and reduced treader teeth breakage, while allowing the treader gang assembly to flex and work independently of the rolling reel baskets 77 during one-sided field obstructions.

Figure 8:
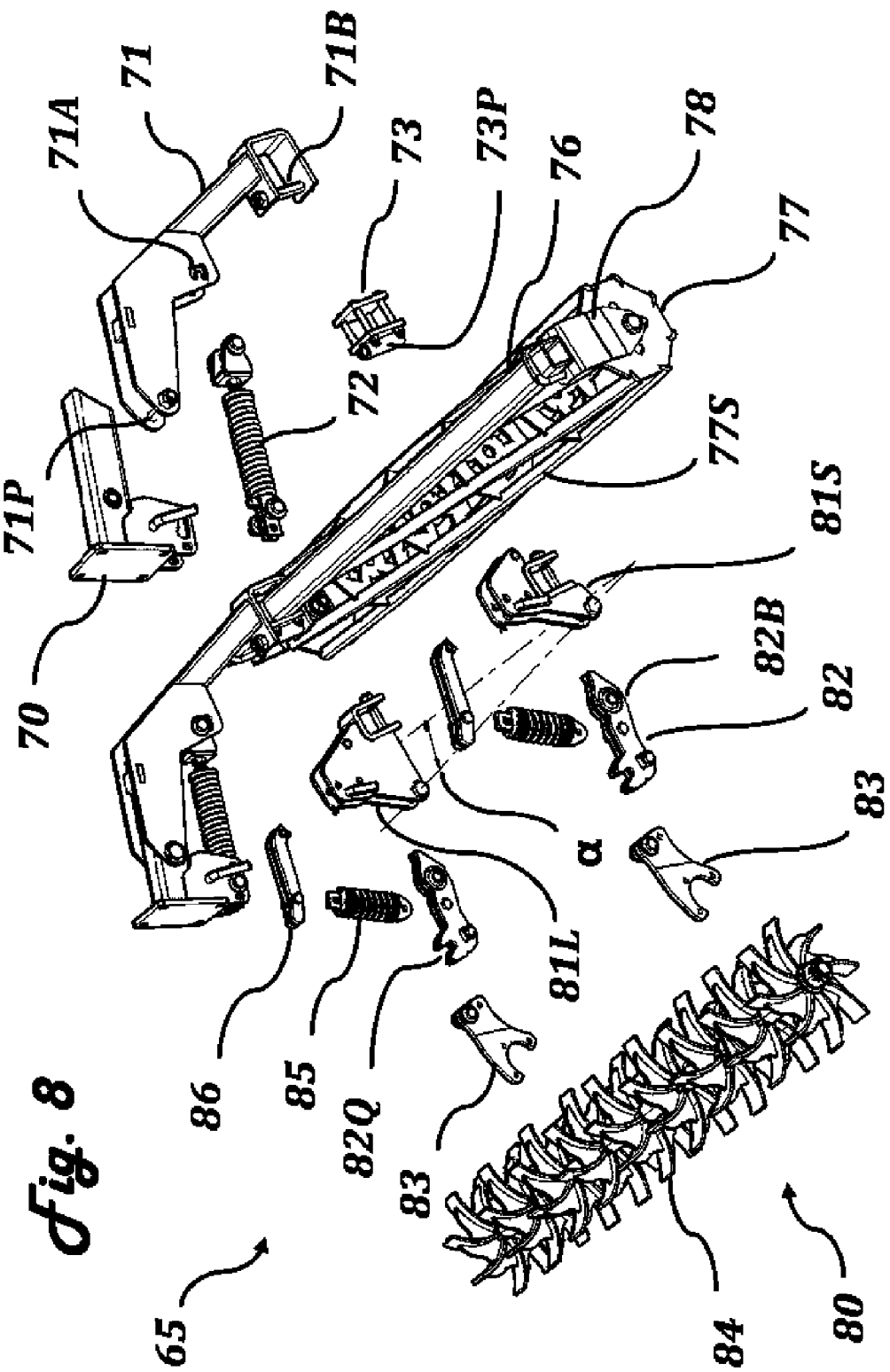
FIG. 8 is a perspective exploded view of the treader and finishing reel attachment with flexible reel over frame tube bolt connections.

FIG. 8 shows a perspective exploded view of the treader and reel assembly. The exploded view shows the individual parts of the treader mounts, arms, spring, brackets and level assemblies. A short and long set of treader mounting brackets 81S and 81L are shown creating the angle alpha α, for the treader gangs. Treader pivot arms 82 are pivotally connected to the treader mounting brackets 81 with a ball joint connection 82B. The treader bearing brackets 83 are bolted to the treader gang 84 with the front 3-hole pattern shown.

Another feature of the present invention is a quick attachment design that allows quick and easy attachment/removal of the treader gang 84 with brackets 83 from the machine when it is not needed, especially in very wet field dry out operations. The quick attach points 82Q allow positioning aid during the re-attachment process. Also shown in FIG. 8 are the spring assemblies 85 and mode spring levers 86 that facilitate different mode settings by the placement of spring mode pin 86P as shown in detail in FIG. 9.

Figure 9:
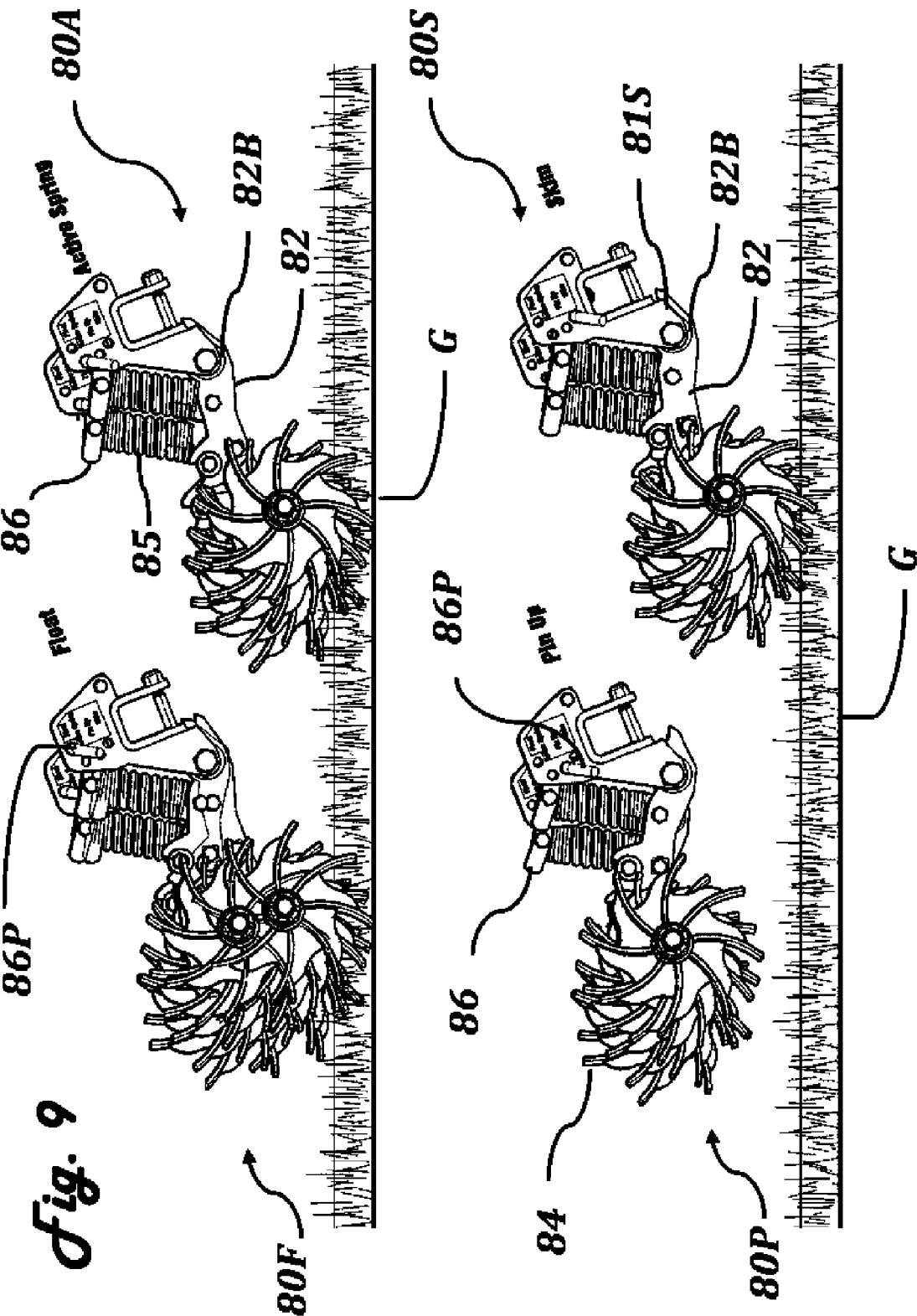
FIG. 9 is a partial orthographic side view of the four different treader operation modes with the various operating mode pin settings shown.

Four different treader modes are shown in the side view of FIG. 9, namely, Float 80F, Active Spring 80A, Pin Up 80P, and Skim mode 80S to allow for different performance characteristics in varying field conditions ranging from wet and soft to hard and dry. With the treader mode pin 86P placed in the top hole of the treader mounting bracket 81, the treader is placed in a "float mode" 80F, where the spring assembly 85 and mode spring lever 86 are not restricted in their upward travel. The float mode arrangement will disable the active down pressure springs and take advantage of the push-configuration self-draft induced down pressure. This provides better treader tooth protection and quicker rock trip performance. With the treader mode pin 86P placed in the second highest hole, the treader mode is set to an "active spring" mode 80A. The treader mode spring lever 86 is limited in its upward travel, thus causing spring compression during field working operations. In active spring mode, the treader downforce is a combination of spring pressure and self-draft induced rotation. A lighter spring can be used on a push-configuration treader to achieve the same results as a trailing treader arrangement, which provides better treader tooth protection and quicker rock trip performance.

The "pin up" mode 80P is also shown in FIG. 9. When the treader action is not needed, the mode pin 86P can be placed under the mode spring lever 86 and in the third hole down from the top. The treader gang is then held up from the soil surface and deactivated to prevent excessive wear and reduce tractor draft loads. In this mode, the treader gang weight is transferred to the finishing reel for extra firming action and can allow the rolling reel to run in a preferred float mode, by moving spring release pin 72P from position 70S to position 70F, to prevent high trip damage and spring overloading.

A unique "skim mode" 80S is another featured treader mode of the present invention. This mode is set by placing the treader mode pin 86P in the lowest hole on the treader mounting bracket 81 to hold up the treader gangs slightly off the soil surface. The treader gangs will still level ridges and break clods while adding some weight to the finishing reel. The extra weight may allow the finishing reel to be run in a more preferred float mode, by moving spring release pin 72P from position 70S to position 70F, to prevent high trip damage and spring overloading.

Figure 10:
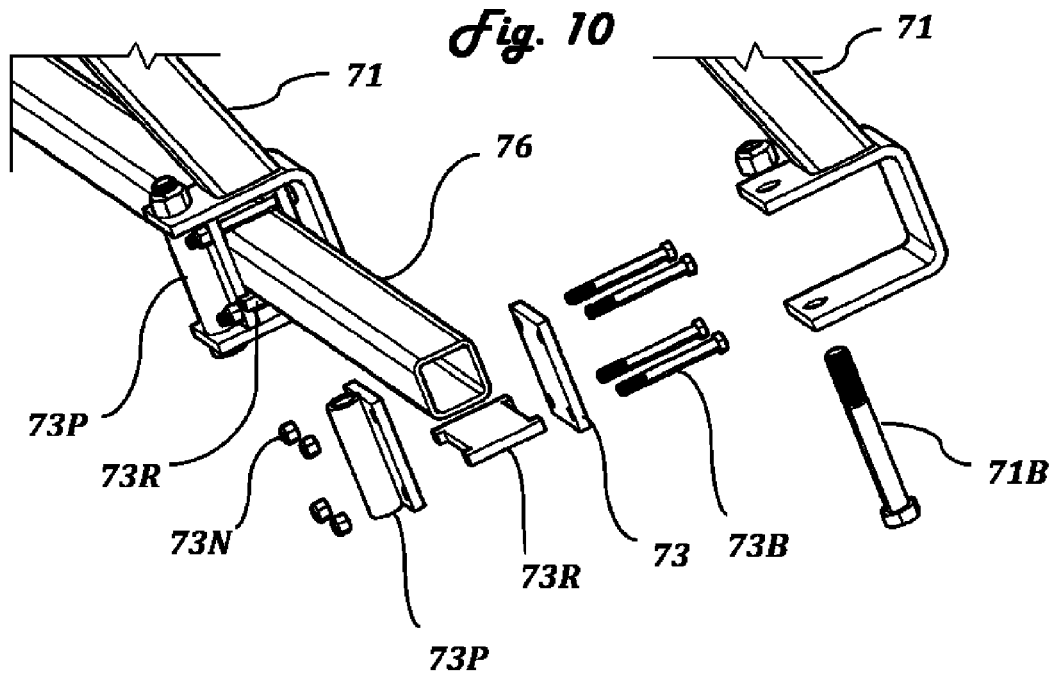
FIG. 10 is a partial perspective view of an enhanced flex connection between the reel arm 71 and the reel over frame tube 76 using a rubber spacer plate 73R to provide an additional joint flex degree of freedom.

Another feature of the present invention is illustrated in FIG. 10, showing a narrow enhanced flex bolt connection between the reel arm 71 and the reel over-frame tube 76. A second degree of flex freedom movement is accomplished by adding a rubber spacer plate 73R inside the 4-bolt clamp plate assembly. The clamp plate assembly 73 and 73P holds the over-frame tube 76 securely in place without slippage. The exploded view shows the full surround enclosure of the over frame tube 76 by the shape of reel arm 71. The 4-bolt clamp plate assembly, including 73, 73P, 73R 73B and 73N, is captured in the surround enclosure of the reel arm 71, thus to provide draft load rotational support of the over frame tube 76 (rotation along is own axis), while allowing flex movement in the other two degrees of freedom axis movement. The enclosure can provide friction against the top and bottom of the clamp plates 73 and 73P, to prevent constant loose rattling and wear while still allowing one-sided obstruction flex movement if needed.

Figure 11:
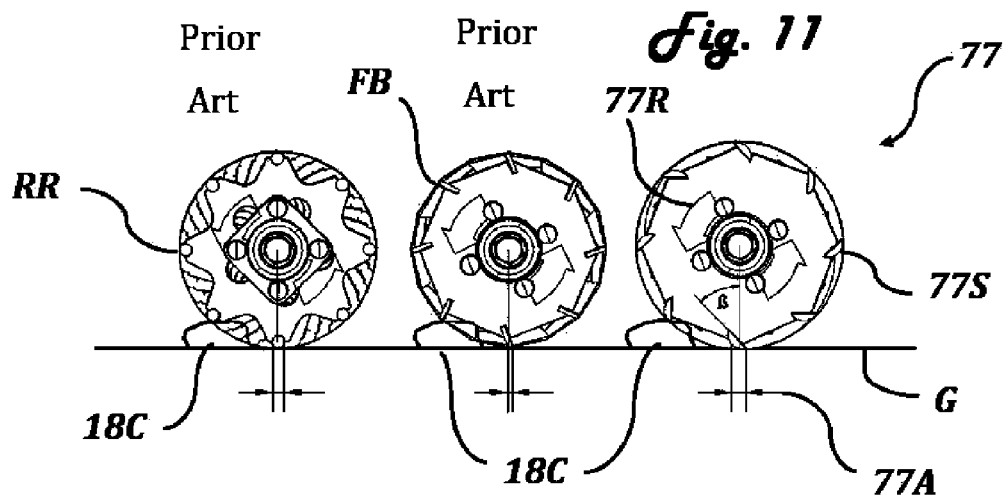
FIG. 11 is a partial comparison side view between the two types of prior art rolling reels, namely round rod and flat bar, and the rolling reel of the present invention, showing the rotational engagement with a field surface clod 18C and the soil contact area of each type of rolling reel.
Figure 12:
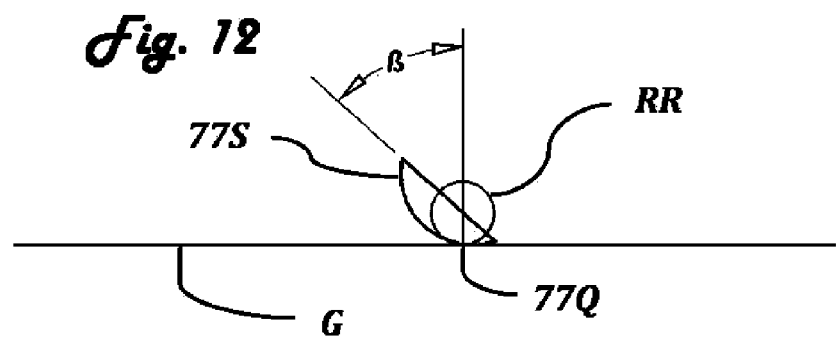
FIG. 12 is a partial comparison side view between the half-round rolling reel slat 77S and an equivalent weighted round rod slat RR, where the cross section area of both slat types are equal, thus being equally weighted, and showing the difference in radial geometry in contact with the soil area at the reel's lowest quadrant position 77Q for the slat angle of B.

FIGS. 11 and 12 show the comparison features between the prior art round rod slatted reel RR and the flat bar slatted reel FB with the present invention half-round slatted rolling reel 77S. FIG. 12 shows the difference in radial geometry of the two equivalent weighted types of rounded reel slats in contact with the soil area at the reel's lowest quadrant position 77Q for the slat angle of B. Both slats have the same cross-section areas, thus having the same linear weight per foot. The half round slat 77S provides a larger soil to reel slat surface contact area than the equivalent weighted round rod slat can provide. The larger slat surface contact area is beneficial to distribute the extra weight transferred from the treader gangs in pin-up or skim mode.

The industry has been offering the choice of prior art round-rod or flat-bar rolling reel designs for many years, but owners have to choose which type to buy that is best for their farming practice and their soil and residue conditions. Apparently it hasn't been obvious to those skilled in the art to use a half round slatted material to accomplish the task of both types of reels in one design. If so, manufactures would be offering a single design that achieves the benefits of both designs with no draw backs.

While the invention has been specifically described in connection with specific embodiments thereof, it is to be understood that this is by way of illustration and not of limitation, and the scope of the appended claims should be construed as broadly as the prior art will permit.

REFERENCE NUMERAL LIST

The following is a list of reference numerals used in the drawings of this application, along with the name of the labeled part:

α Treader gang angle
β Reel slat angle
G Ground
RR Prior art round rod slat (equivalent weighted)
FB Prior art flat bar slat
10 FIG. 1 shallow working 3-section implement with finishing reel-only attachment.
10 FIG. 2 shallow working 3-section implement with finishing reel & treader attachment.
12 Primary front gang assembly
13 Primary rear gang assembly
14 Main lift & transport assembly wheels
15 Wing lift assembly wheels
16 Hitch assembly
17 Tractor or Towing vehicle
18 Field obstruction
18C Field surface clod
21 Center frame assembly
21F Center frame
25 Wing frame assembly
25F Wing frame
60 Reel-only finishing attachment 65 Reel and treader finishing attachment
70 Rear attachment mounting head
70F Down pressure spring float position
70S Down pressure active spring position
71 Reel arm
71A Reel down pressure adjustment
71B Reel arm flex pivot bolt
71P Reel arm pivot
71S Reel arm stop
72 Reel down pressure spring
72P Reel spring release pin
73 Reel 4-hole clamp plate
73B Clamp plate bolt
73N Clamp plate nut
73R Rubber spacer plate
73P Clamp plate pivot
76 Reel over frame tube
77 Rolling reel basket
77A Reel slat soil contact area at lowest quadrant position
77Q Reel slat lowest quadrant position
77R Reel forward rotation
77S Reel slat
78 Reel standard
80 Treader assembly
80A Treader Mode Active Spring
80F Treader Mode Float
80P Treader Mode Pin up
80S Treader Mode Skim
81L Treader mounting bracket long
81S Treader mounting bracket short
82 Treader pivot arm
82B Treader pivot ball joint
82Q Treader quick attach
83 Treader bearing bracket
84 Treader gang
85 Treader Spring assembly
86 Treader mode spring lever
86P Treader mode pin

What is claimed is:

1. An agricultural tillage implement, comprising:
a main frame with a plurality of ground support wheels, a group of primary seedbed preparation tools supported by the main frame, and a finishing attachment arranged behind the seedbed preparation tools, said finishing attachment comprising:
a rolling reel assembly connected to the main frame by reel arms, said rolling reel assembly having an over-frame tube connected to said reel arms, reel standards attached to said over-frame tube, and a rolling reel basket supported by said reel standards; and
a push configuration treader assembly mounted compactly close to and ahead of the rolling reel assembly to provide clod sizing, residue pinning, soil field leveling, chemical incorporation and in-between primary blade tillage action for enhanced seedbed preparation operation.

2. The implement according to claim 1, wherein said treader assembly comprises at least one gang mounted at a slight angle to a line perpendicular to a line of travel by mounting brackets having different lengths mounted on said reel over-frame tube, said mounting brackets being laterally adjustable to selectively target unworked soil left by the primary seedbed preparation tillage tools.

3. The implement according to claim 2, wherein said treader assembly gang is mounted at an angle of 5 to 10 degrees to a line perpendicular to the line of travel.

4. The implement according to claim 2, wherein said treader assembly gang is pivotally mounted to said mounting brackets by a ball joint to provide multiple degrees of flex freedom during one-sided obstacle encounters.

5. The implement according to claim 1, further comprising mounting brackets attached to said reel over-frame tube, and wherein said treader assembly comprises at least one gang pivotally mounted to said mounting brackets by quick attachment connections to allow quick and easy removal and reassembly of the treader assembly gang.

6. The implement according to claim 1, further comprising mounting brackets attached to said reel over-frame tube, and wherein said treader assembly comprises at least one gang pivotally mounted to said mounting brackets at treader trip pivot points located at or slightly below a height of the reel over-frame tube to provide self-draft induced dynamic downforce loading of the treader assembly while also providing quick vertical trip and efficient obstacle damage protection.

7. The implement according to claim 1, further comprising mounting brackets attached to said reel over-frame tube, and wherein said treader assembly comprises at least one gang pivotally mounted to said mounting brackets, and multiple treader operation modes are provided by changing a pin position on said mounting brackets that controls a spring lever position and trip height to allow for different performance characteristics in varying field conditions.

8. The implement according to claim 7, wherein said treader operation modes include at least an active spring mode and a float mode, said float mode being arranged to disable active down pressure springs and take advantage of a push-configuration self-draft induced down pressure.

9. The implement according to claim 8, wherein said treader operation modes include a pin up mode to fully disengage the treader gang when not needed while providing extra weight to the finishing reel assembly for firmer seedbeds.

10. The implement according to claim 9, wherein said treader operation modes include a skim mode to allow the treader gang to skim the soil surface to level ridges, redistribute residue and break clods while transferring a portion of the weight of the treader gang to the rolling reel assembly for firmer seedbeds.

11. The implement according to claim 1, wherein said over-frame tube is connected to each of said reel arms by a narrow flex pivoting connection arrangement that allows both the rolling reel gangs and the push configuration treader gangs to flex over one-sided obstructions.

12. The implement according to claim 1, wherein said rolling reel basket has slats made from lengths of material having a rounded side, a flat side, and an edge between said rounded and flat sides, and said slats being oriented so that said edge is a leading edge relative to a direction of rotation during operation to provide clod breakage and residue pinning action during its descent, and so that said rounded side provides a soil firming action at its lowest quadrant position.

13. The implement according to claim 12, wherein said lengths of material have a shape of a truncated cylinder cut along a plane parallel to a longitudinal axis of the cylinder.

* * * * *